US012633577B2

(12) United States Patent
Oh et al.

(10) Patent No.: US 12,633,577 B2
(45) Date of Patent: May 19, 2026

(54) LITHIUM SECONDARY BATTERY COMPRISING SINGLE PARTICLE POSITIVE ELECTRODE ACTIVE MATERIAL

(71) Applicant: LG Energy Solution, Ltd., Seoul (KR)

(72) Inventors: Il Geun Oh, Daejeon (KR); Song Taek Oh, Daejeon (KR); Su Mi Yoon, Daejeon (KR); Mi Ru Jo, Daejeon (KR); Jie Hyun Seong, Daejeon (KR); Min Soo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/985,372

(22) Filed: Dec. 18, 2024

(65) Prior Publication Data

US 2025/0210724 A1     Jun. 26, 2025

(30) Foreign Application Priority Data

Dec. 22, 2023     (KR) ........................ 10-2023-0190458

(51) Int. Cl.
*H01M 10/42*     (2006.01)
*H01M 4/02*     (2006.01)
*H01M 4/36*     (2006.01)
*H01M 4/38*     (2006.01)
*H01M 4/525*     (2010.01)
(Continued)

(52) U.S. Cl.
CPC ........... *H01M 10/42* (2013.01); *H01M 4/364* (2013.01); *H01M 4/386* (2013.01); *H01M 4/525* (2013.01); *H01M 4/587* (2013.01);
*H01M 10/0525* (2013.01); *H01M 2004/021* (2013.01); *H01M 2010/4292* (2013.01)

(58) Field of Classification Search
None
See application file for complete search history.

(56) References Cited

U.S. PATENT DOCUMENTS

2009/0325061 A1     12/2009  Lim
2013/0177812 A1*    7/2013   Han ...................... H01M 4/525
                                                                252/520.5

(Continued)

FOREIGN PATENT DOCUMENTS

EP          4276938  A1     11/2023
JP          6428647  B2     11/2018

(Continued)

OTHER PUBLICATIONS

International Search Report for Application No. PCT/KR2024/020626 mailed Mar. 24, 2025, 3 pages. [See p. 2, categorizing the cited references].

(Continued)

*Primary Examiner* — Zhongqing Wei

(74) *Attorney, Agent, or Firm* — Lerner David LLP

(57)     ABSTRACT

A lithium secondary battery having high energy density and excellent lifetime characteristics includes: (1) a positive electrode containing a positive electrode active material in a single particle form having a $D_{50}$ of 5.5 μm to 8 μm; (2) a negative electrode containing a first negative electrode active material having a Si—C composite; and (3) an electrolyte. The irreversible capacity per unit area of the negative electrode is smaller than an irreversible capacity per unit area of the positive electrode.

20 Claims, 3 Drawing Sheets

(51) Int. Cl.
H01M 4/587 (2010.01)
H01M 10/0525 (2010.01)

(56) References Cited

U.S. PATENT DOCUMENTS

| | | | |
|---|---|---|---|
| 2015/0364760 A1* | 12/2015 | Park | H01M 4/131 |
| | | | 429/223 |
| 2016/0351905 A1 | 12/2016 | Kawamura et al. | |
| 2020/0136172 A1* | 4/2020 | Lee | H01M 4/525 |
| 2020/0251728 A1 | 8/2020 | Song et al. | |
| 2021/0020902 A1 | 1/2021 | Yoo et al. | |
| 2021/0159488 A1* | 5/2021 | Choi | H01M 4/483 |
| 2021/0408537 A1* | 12/2021 | Hwang | H01M 10/052 |
| 2023/0095804 A1 | 3/2023 | Park et al. | |
| 2023/0178727 A1 | 6/2023 | Noh et al. | |
| 2023/0275209 A1 | 8/2023 | Yoo et al. | |
| 2024/0088378 A1 | 3/2024 | Son et al. | |
| 2024/0194852 A1 | 6/2024 | Yoo et al. | |
| 2024/0243278 A1 | 7/2024 | Kim et al. | |
| 2024/0332531 A1 | 10/2024 | Kim et al. | |

FOREIGN PATENT DOCUMENTS

| | | | |
|---|---|---|---|
| KR | 100838944 | B1 | 6/2008 |
| KR | 20100002695 | A | 1/2010 |
| KR | 20160079508 | A | 7/2016 |
| KR | 20190044450 | A | 4/2019 |
| KR | 2021-0097025 | A | 8/2021 |
| KR | 102398689 | B1 | 5/2022 |
| KR | 20230049043 | A | 4/2023 |
| KR | 20230052314 | A | 4/2023 |
| KR | 2023-0074011 | A | 5/2023 |
| KR | 2023-0085513 | A | 6/2023 |
| KR | 2023-0121577 | A | 8/2023 |
| WO | 2019-013521 | A2 | 1/2019 |
| WO | 2023090948 | A1 | 5/2023 |
| WO | 2023090950 | A1 | 5/2023 |

OTHER PUBLICATIONS

Extended European Search Report including Written Opinion for Application No. 24220834.6 dated Apr. 30, 2025, pp. 1-12.

* cited by examiner

LITHIUM SECONDARY BATTERY COMPRISING SINGLE PARTICLE POSITIVE ELECTRODE ACTIVE MATERIAL

CROSS-REFERENCE TO RELATED APPLICATION

This application claims priority under 35 U.S.C. § 119(a) to Korean Patent Application No. KR-10-2023-0190458, which was filed on Dec. 22, 2023 and is incorporated by reference herein in its entirety.

FIELD

The present application relates to a lithium secondary battery, including a solid-state lithium secondary battery.

BACKGROUND

A secondary battery is drawing attention as a new energy source for enhancing environment friendliness and energy efficiency in that the use of fossil fuels can be reduced greatly and no byproduct is generated during energy consumption. A lithium secondary battery generally includes a positive electrode, a negative electrode, a separator, and an electrolyte, and the positive electrode and the negative electrode include active materials capable of intercalating and deintercalating lithium ions. A solid-state lithium secondary battery generally includes a positive electrode, a negative electrode, and a solid-state electrolyte, and the negative electrode include active materials capable of intercalating and deintercalating lithium ions.

Recently, according to rapid increase of an electric vehicle market, demand for a battery with excellent fast-charging performance and high energy density is increasing. Accordingly, attempts to apply a high-nickel lithium nickel-based oxide, which is excellent in capacity characteristics, as a positive electrode active material and to apply a Si-based negative electrode active material, which is excellent in fast-charging performance and capacity characteristics, as a negative electrode active material are increasing.

However, in a case where the content of nickel in the positive electrode active material increases, the capacity characteristics may be improved, but there is a limitation that repetitive charging and discharging causes highly reactive $Ni^{+4}$ ions to be generated in large amount, and thus causes structural collapse of the positive electrode active material, thereby increasing the deterioration rate of the positive electrode active material and reducing lifetime characteristics.

In addition, due to a large irreversible capacity, the Si-based negative electrode active material has low negative electrode efficiency, and in a process of charging and discharging, the change in volume is large, and accordingly, deterioration of the negative electrode is accelerated during the charging and discharging, thereby reducing the lifetime characteristics.

Therefore, development of a lithium secondary battery, which provides excellent lifetime characteristics as well as high energy density, is required.

Summary Technical Problem

In order to solve the above-described limitation, the present disclosure provides a lithium secondary battery excellent in lifetime characteristics as well as having a high energy density by applying a single-particle positive electrode active material having a medium-sized particle diameter and a negative electrode active material including a Si—C composite, and by designing such that the irreversible capacity of a negative electrode is smaller than the irreversible capacity of a positive electrode.

Technical Solution

The present invention provides an electrode assembly comprising
a positive electrode comprising a positive electrode active material in a single particle form having a $D_{50}$ of 5.5 μm to 8 μm and comprising a lithium oxide; and
a negative electrode comprising a first negative electrode active material having a Si—C composite.

An irreversible capacity per unit area of the negative electrode may be smaller than an irreversible capacity per unit area of the positive electrode. The ratio of the irreversible capacity per unit area of the positive electrode to the irreversible capacity per unit area of the negative electrode may be greater than 1, preferably 1.01 to 1.25, and more preferably, 1.01 to 1.2.

The lithium oxide of the positive electrode active material in a single particle form may be a lithium nickel-based oxide containing Ni at 88 mol % or greater, and preferably at 90 mol % or greater, and the lithium nickel-based oxide may be represented by, for example, [Chemical Formula 1] below.

$$Li_{1+x}[Ni_aCo_bM^1_cM^2_d]O_2 \qquad \text{[Chemical Formula 1]}$$

In [Chemical Formula 1] above, $M^1$ is one or more selected from Mn and Al, $M^2$ includes one or more selected from the group consisting of Zr, Y, B, W, Mg, Ce, Hf, Ta, La, Ti, Sr, Ba, F, P, and S, and $-0.2 \leq x \leq 0.2$, $0.88 \leq a < 1$, $0 < b < 0.12$, $0 < c < 0.12$, and $0 \leq d \leq 0.05$.

The positive electrode may have a porosity of 16% to 24%, preferably of 16% to 23%, and more preferably of 16% to 22%, 16% to 21%, 16% to 20%, 16% to 19%, 16% to 18%, or 16% to 17%.

The positive electrode may have a total thickness of 90 μm to 120 μm, preferably of 90 μm to 105 μm or 90 μm to 110 μm, and more preferably of 95 μm to 105 μm or 95 μm to 100 μm.

The positive electrode may have an efficiency less than 90%, preferably of 87% or greater and less than 90%, and more preferably of 87% to 89% or 87% to 88%.

The positive electrode may have a discharge capacity of 200 mAh/g to 400 mAh/g or 200 mAh/g to 350 mAh/g, preferably of 200 mAh/g to 300 mAh/g or 250 mAh/g to 300 mAh/g, and more preferably of 210 mAh/g to 300 mAh/g, 210 mAh/g to 300 mAh/g, 220 mAh/g to 300 mAh/g, 230 mAh/g to 300 mAh/g, 240 mAh/g to 300 mAh/g, 250 mAh/g to 300 mAh/g, 260 mAh/g to 300 mAh/g, 270 mAh/g to 300 mAh/g, 280 mAh/g to 300 mAh/g, or 290 mAh/g to 300 mAh/g.

The negative electrode may further include a graphite-based negative electrode active material as a second negative electrode active material. The weight ratio of the first negative electrode active material to the second negative electrode active material may be 2:98 to 20:80, 2:98 to 15:85, 2:98 to 10:90, or 2:98 to 5:95, preferably 2:98 to 15:85, and more preferably 5:95 to 15:85, 5:95 to 10:90, or 5:95 to 7:93.

The negative electrode may have a porosity of 20% to 30% or 21% to 30%, preferably of 22% to 29%, and more preferably of 23% to 28%, 24% to 28%, 25% to 28%, 26% to 28%, or 27% to 28%.

The negative electrode may have a total thickness of 80 μm to 130 μm or 85 μm to 130 μm, preferably of 90 μm to 120 μm, and more preferably of 95 μm to 120 μm, 95 μm to 115 μm, 95 μm to 110 μm, 95 μm to 105 μm, or 95 μm to 100 μm.

The negative electrode may have an efficiency of 90% or greater, preferably of 90% to 94%, and more preferably of 90% to 93%, 90% to 92%, or 90% to 91%.

The negative electrode may have a discharge capacity of 400 mAh/g to 600 mAh/g or 450 mAh/g to 600 mAh/g, preferably of 400 mAh/g to 550 mAh/g, 450 mAh/g to 550 mAh/g, or 500 mAh/g to 550 mAh/g, and more preferably of 450 mAh/g to 550 mAh/g or 500 mAh/g to 550 mAh/g.

The electrode assembly may have a N/P ratio of 105 or greater, preferably 106 to 110, and more preferably of 106.5 to 108.

According to another aspect of the disclosure, a unit cell having one negative electrode, one positive electrode, and two separators is disclosed.

The unit cell may have a thickness of 220 μm to 240 μm, preferably 225 μm to 240 μm, and more preferably 230 μm to 240 μm.

The unit cell may have a capacity per unit volume of 270 mAh/cm$^3$ or greater, preferably of 270 mAh/cm$^3$ to 330 mAh/cm$^3$ or 280 mAh/cm$^3$ to 330 mAh/cm$^3$, and more preferably of 290 mAh/cm$^3$ to 320 mAh/cm$^3$, 300 mAh/cm$^3$ to 320 mAh/cm$^3$ or 310 mAh/cm$^3$ to 320 mAh/cm$^3$.

According to another aspect, the present invention relates to a lithium secondary battery comprising:

an electrolyte, and the electrode assembly as defined above or the unit cell as defined above.

Advantageous Effects

A lithium secondary battery according to the present disclosure includes:

a positive electrode active material containing a lithium nickel-based oxide in a single particle form having a relatively large $D_{50}$, compared to a conventional one, and a negative electrode active material containing a Si—C composite.

In case of the positive electrode active material in a single particle form, the larger the particle diameter, the greater the resistance, and therefore, when a single-particle positive electrode active material having a large $D_{50}$ is applied as in the present disclosure, the positive electrode resistance increases, and accordingly, the irreversible capacity of the positive electrode increases too. Moreover, the Si—C composite has a smaller irreversible capacity than silicon oxide which has often been used as a Si-based negative electrode active material conventionally. That is, the lithium secondary battery of the present disclosure is designed such that the irreversible capacity of the negative electrode is smaller than the irreversible capacity of the positive electrode, unlike the conventional lithium secondary battery, by increasing the positive electrode resistance to increase the irreversible capacity of the positive electrode, and by applying a negative electrode active material with smaller irreversible capacity than silicon oxide. Accordingly, since the negative-electrode irreversible capacity is smaller than the positive-electrode irreversible capacity, the use of low potential region, causing expansion of the volume of the negative electrode during charging and discharging, may be minimized, and accordingly, the expansion of the volume of the negative electrode is minimized, so that deterioration of the lifetime characteristics, due to the negative electrode deterioration, are minimized.

Moreover, the Si—C composite, used as the negative electrode active material in the present disclosure, has excellent capacity characteristics, compared to silicon oxide. Therefore, it may be possible to achieve higher energy density with the first negative electrode active material of the present invention than with a conventional silicon oxide.

Furthermore, by applying the positive electrode active material in a single particle form having a large $D_{50}$, as in the present disclosure, rapid deterioration of the positive electrode active material, caused by increase in Ni content, may be suppressed. Therefore, in the present disclosure, a high-nickel positive electrode active material, having a high Ni content at 88 mol % or greater, 89 mol % or greater, 90 mol % or greater, 91 mol % or greater, 92 mol % or greater, 93 mol % or greater, 94 mol % or greater, 95 mol % or greater, 96 mol % or greater, or 97 mol % or greater may be applied, and therefore, high energy density may be achieved.

DETAILED DESCRIPTION

It will be understood that terms or words used in the specification and claims shall not be interpreted as the meaning defined in commonly used dictionaries, and it will be further understood that the terms or words should be interpreted as having a meaning that is consistent with their meaning in the context of the relevant art and the technical idea of the invention, based on the principle that an inventor may properly define the meaning of the terms or words to best explain the invention.

Figure 1:
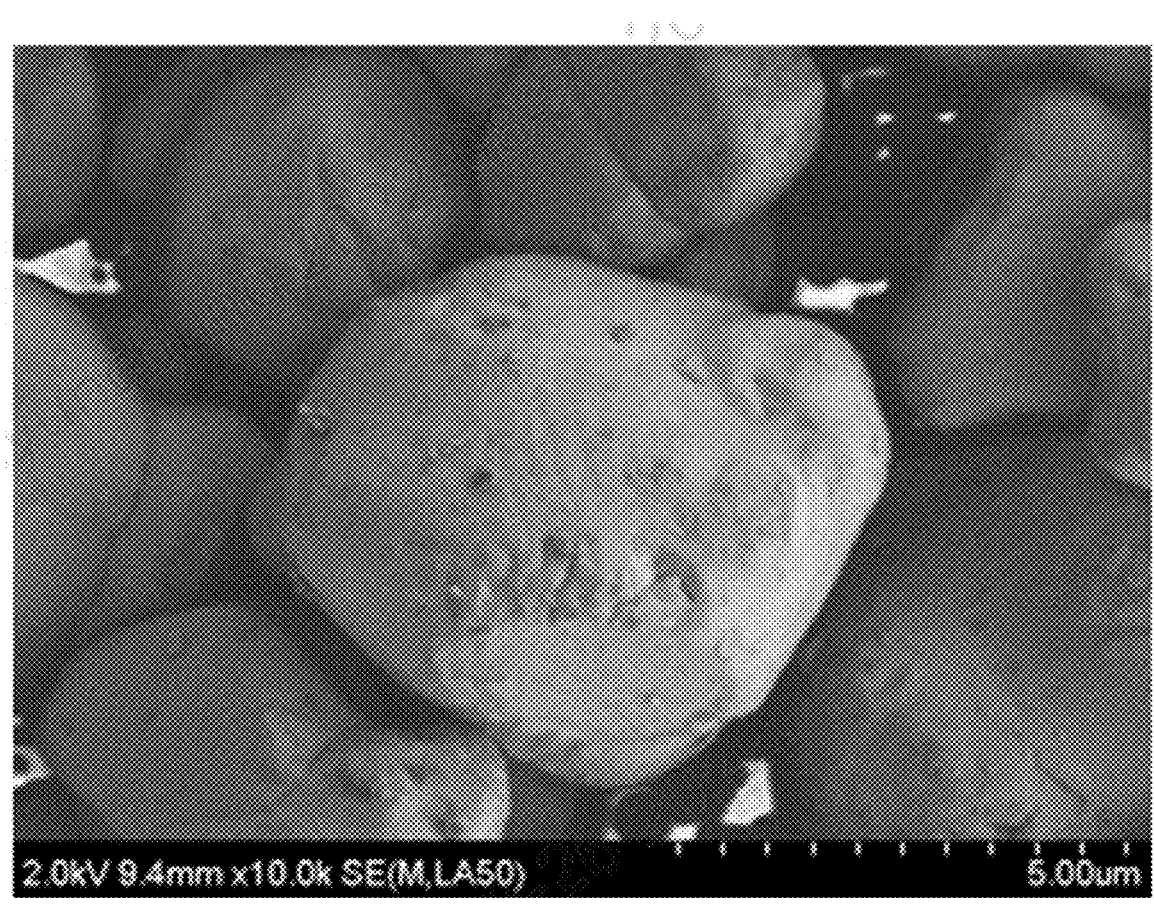
FIG. 1 is a scanning electron microscope photograph of a single particle positive electrode active material.
Figure 2:
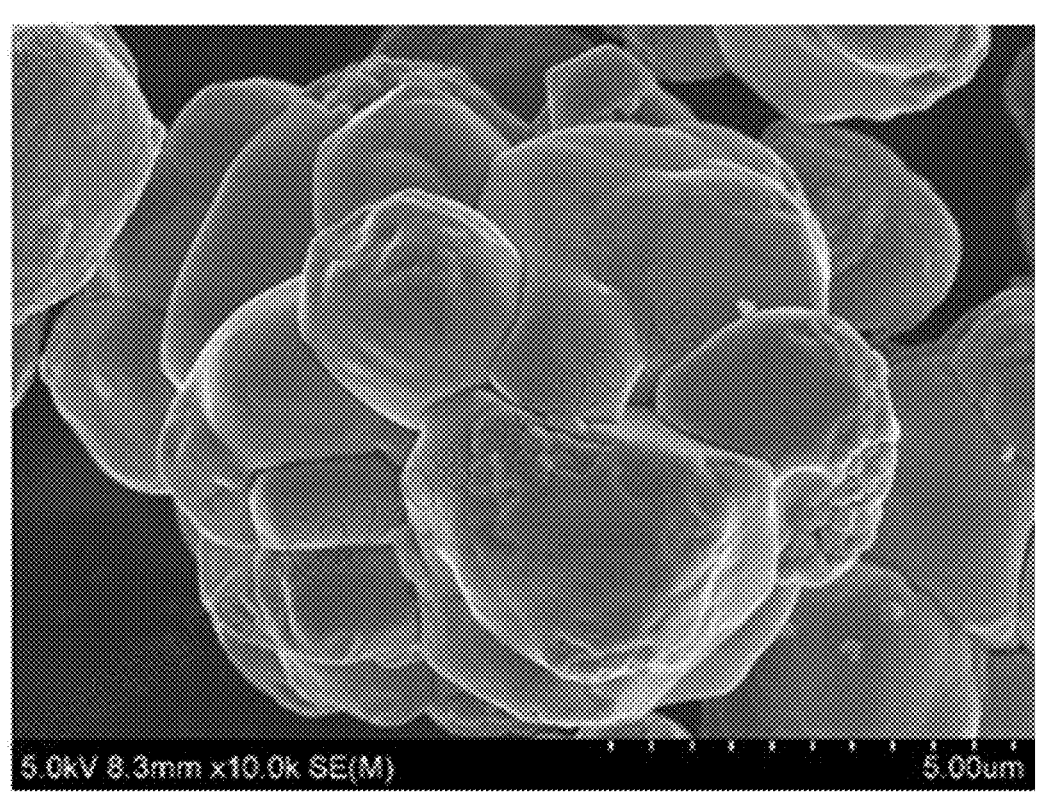
FIG. 2 is a scanning electron microscope photograph of a quasi-single particle positive electrode active material.

In the present disclosure, a "single particle type" refers to a particle composed of 30 or less nodules, 25 or less nodules, 20 or less nodules, 15 or less nodules, 10 or less nodules, or 5 or less nodules, and refers to a concept including a single particle composed of one nodule and a quasi-single particle that is a composite of 2 to 30 nodules, 2 to 25 nodules, 2 to 20 nodules, 2 to 15 nodules, 2 to 10 nodules, or 2 to 5 nodules. FIG. 1 shows a scanning electron microscope photo of a positive electrode active material in the form of a single particle, and FIG. 2 shows a scanning electron microscope photo of a positive electrode active material in the form of a quasi-single particle.

The "nodule" may be a sub-particle unit that constitutes a single particle and a quasi-single particle, and may be a single crystal not having a crystalline grain boundary, or a polycrystal in which a grain boundary is not present in appearance when observed at 5000 times to 20000 times, 5000 times to 15000 times, 5000 times to 10000 times magnification using a scanning electron microscope.

Figure 3:
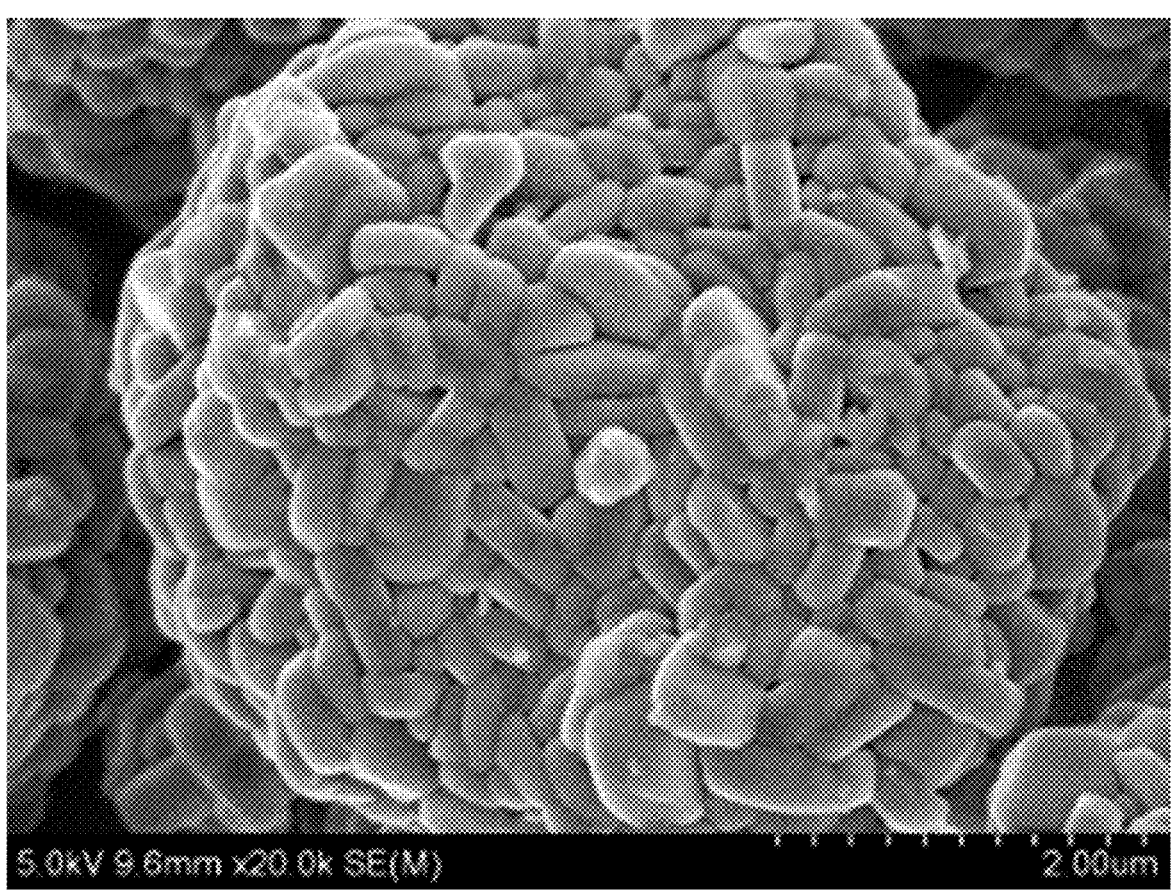
FIG. 3 is a scanning electron microscope photograph of a secondary particle type positive electrode active material.

In the present disclosure, a "secondary particle type" refers to a particle which is formed by aggregation of a plurality of, for example, tens to hundreds of primary particles. In particular, the secondary particle may be an aggregate of 31 or more primary particles, 50 or more primary particles, 70 or more primary particles, or 100 or more primary particles. FIG. 3 shows a scanning electron micrograph (SEM) of a positive electrode active material in the form of secondary particles.

In the present disclosure, a "particle" refers to a concept that includes any one among a single particle, a quasi-single particle, a primary particle, a nodule, and a secondary particle, or all thereof.

In the present disclosure, the average particle diameter ($D_{mean}$) of a nodule or a primary particle refers to a value obtained by measuring particle diameters of nodules or primary particles observed from a scanning electron microscope image and then calculating the arithmetic mean value therefrom.

In the present disclosure, "$D_{50}$" refers to a particle size corresponding to a cumulative volume of 50% in a cumulative volume particle size distribution of powder to be measured, and may be measured by using a laser diffraction method. For example, after the powder to be measured is dispersed in a dispersion medium, the dispersion medium is introduced into a commercial laser diffraction particle size measurement instrument (e.g., Microtrac MT 3000) and irradiated with ultrasonic waves of about 28 kHz at an output of 60 W, and then a cumulative volume particle size distribution graph is obtained, and the particle size corresponding to 50% of the cumulative volume may then be calculated therefrom to measure the $D_{50}$.

In the present disclosure, a "irreversible capacity" refers to a difference between a charge capacity and a discharge capacity, and the irreversible capacity of the negative electrode and the irreversible capacity of the positive electrode may be measured by respective methods as follows.

Method of Measuring Negative Electrode Irreversible Capacity

A single-sided negative electrode, in which a negative electrode composite layer is formed on one side of a negative electrode current collector, is prepared. In a case where a negative electrode to be measured is a double-sided negative electrode having the negative electrode composite layers formed on both sides of the negative electrode current collector, the negative electrode composite layer formed on one side is cleansed and removed to prepare a single-sided negative electrode. A negative electrode coin half-cell, having the single-sided negative electrode prepared as described above and a lithium metal electrode as a counter electrode, is manufactured, then charged with 0.1 C and CC-CV mode (0.005 C cut-off) until a voltage reaches 5 mV, and then discharged with 0.1 C and CC mode until the voltage reaches 1 V to measure a charge capacity and a discharge capacity, and an irreversible capacity may be calculated from the difference between the measured charge capacity and the measured discharge capacity. In addition, an irreversible capacity per unit area may be calculated by dividing the irreversible capacity by the area of the negative electrode. The area of the negative electrode is calculated as the product of the width (cm) and the length (cm) of the negative electrode composite layer.

The timing for measuring irreversible capacity is not limited. For example, it can be measured using an anode obtained by disassembling a cell, e.g., a unit cell.

Method of Measuring Positive Electrode Irreversible Capacity

A single-sided positive electrode, in which a positive electrode composite layer is formed on one side of a positive electrode current collector, is prepared. In a case where a positive electrode to be measured is a double-sided positive electrode having positive electrode composite layers being formed on both sides of the positive electrode current collector, the positive electrode composite layer formed on one side is cleansed and removed to prepare a single-sided positive electrode. A positive electrode coin half-cell, having the single-sided positive electrode prepared as described above and a lithium metal electrode as a counter electrode, is manufactured, then charged with 0.1 C and CC-CV mode (0.05 C cut-off) until a voltage reaches 4.25 V to 4.4 V, and then discharged with 0.1 C and CC mode until the voltage reaches 3 V to measure a charge capacity and a discharge capacity, and an irreversible capacity may be calculated from the difference between the measured charge capacity and the measured discharge capacity.

In addition, an irreversible capacity per unit area may be calculated by dividing the irreversible capacity by the area of the positive electrode. The area of the positive electrode is calculated as the product of the width (cm) and the length (cm) of the positive electrode composite layer.

The timing for measuring irreversible capacity is not limited. For example, it can be measured using a cathode obtained by disassembling a cell, e.g., a unit cell.

The charge final voltage may differ according to the type of a positive electrode active material. For example, when the cathode active material is secondary particle-type NCM with a Ni content of 80 mol % or higher, the charge cutoff voltage can range from 4.25V to 4.3V. In contrast, when the cathode active material is single particle-type NCM with a Ni content of 70 mol % or lower, the charge cutoff voltage can range from 4.3V to 4.4V.

In the present disclosure, the "porosity (%)" may be calculated by (1−(electrode density/electrode true density)). The electrode density can be measured by dividing the electrode weight by the electrode volume after measuring the weight and volume of the electrode. The true density of the electrode can be measured using a Gas Pycnometer. A Gas Pycnometer is a device that measures density by placing a sample of known weight into a sample chamber, injecting helium or nitrogen gas, and determining the volume occupied by the sample excluding pores. Specifically, the volume of the sample is calculated based on the pressure changes between the sample chamber and a reference chamber of known volume. Using the ideal gas law (PV=nRT), the density of the sample can then be determined.

In the present disclosure, "efficiency" refers to the ratio of a measured discharge capacity to a measured charge capacity.

Hereinafter, the present disclosure will be described in more detail.

As a result of repeated research for developing a lithium secondary battery having excellent lifetime characteristics as well as capable of providing high energy density, the present inventors found out that, when a lithium secondary battery is prepared by applying a single-particle positive electrode active material having a $D_{50}$ of 5.5 μm to 8 μm and a negative electrode active material containing a Si—C composite, thus enabling the irreversible capacity per unit area of the negative electrode to be smaller than the irreversible capacity per unit area of the positive electrode, the energy density, the lifetime characteristics, and fast-charging performance may be all excellently achieved, and therefore, have completed the present disclosure. Fast-charging performance may also be excellently achieved by the lithium secondary battery according to the present invention. Moreover, since the lifetime of the lithium secondary battery according to the present invention is increased, then the carbon footprint of said lithium secondary battery is advantageously minimized.

In particular, the lithium secondary battery according to the present disclosure includes a positive electrode containing a positive electrode active material in a single particle form having a $D_{50}$ of 5.5 μm to 8 μm, 6.0 μm to 8 μm, 6.5 μm to 8 μm, 7.0 μm to 8 μm, or 7.5 μm to 8 μm; a negative electrode containing a first negative electrode active material having a Si—C composite; and an electrolyte, and the lithium secondary battery may be characterized by the irreversible capacity per unit area of the negative electrode being smaller than the irreversible capacity per unit area of the positive electrode. The ratio of the irreversible capacity per unit area of the positive electrode to the irreversible capacity per unit area of the negative electrode may be greater than 1, preferably 1.01 to 1.25, 1.02 to 1.25, 1.03 to 1.25, 1.04 to 1.25, 1.05 to 1.25, 1.06 to 1.25, 1.07 to 1.25, 1.08 to 1.25, 1.09 to 1.25, 1.10 to 1.25, 1.15 to 1.25, and more preferably 1.01 to 1.2, 1.02 to 1.2, 1.03 to 1.2, or 1.04 to 1.2.

Since a Si-based negative electrode active material has a large irreversible capacity, it was common that the irreversible capacity of the negative electrode was larger than the irreversible capacity of the positive electrode in a conventional lithium secondary battery having the Si-based negative electrode active material applied thereto. However, when the irreversible capacity of the negative electrode is larger than the irreversible capacity of the positive electrode, the range of a driving voltage is limited to the range excluding the irreversible capacity of the negative electrode, so that loss of a reversible capacity of the positive electrode occurs and it reduces the capacity, and a low potential region of the negative electrode, in which rapid volume expansion of the Si-based negative electrode active material occurs, is used, resulting in reduction of the lifetime characteristics.

In the present disclosure, in order to solve this problem, the lithium secondary battery was designed such that a positive electrode active material in a single particle form having a large $D_{50}$, compared to a conventional one (about 3 μm), was used as the positive electrode active material, and a Si—C composite was used as the negative electrode active material to thereby make the irreversible capacity per unit area of the positive electrode larger than the irreversible capacity per unit area of the negative electrode.

The positive electrode active material in a single particle form has a small grain boundary between particles that is a movement path of lithium ions, and thus it has high resistance compared to a conventionally used secondary particle, and the larger the particle diameter, the higher the resistance. Therefore, when the positive electrode active material in a single particle form having a large $D_{50}$ is applied, due to the increase in resistance, the positive electrode efficiency decreases, and the irreversible capacity increases too. In particular, the positive electrode according to the present disclosure may have an efficiency less than 90%, preferably of 87% or greater and less than 90%, and more preferably of 87% to 89% or from 88% to 89%.

Moreover, since the Si—C composite has a smaller irreversible capacity than that of a silicon oxide-based negative electrode active material that has been conventionally mainly used, the negative electrode, if applied therewith, has increased efficiency and a reduced irreversible capacity compared to the conventional one. In particular, the negative electrode according to the present disclosure may have an efficiency of 90% or greater, preferably of 90% to 94%, 91% to 94%, 92% to 94%, or 93% to 94%, and more preferably of 90% to 93%, 91% to 93%, 92% to 93%.

Accordingly, in the case where the positive electrode active material in a single particle form having a large $D_{50}$ and the negative electrode active material containing a Si—C composite are applied, unlike the case of a conventional lithium secondary battery, the lithium secondary battery in which the irreversible capacity per unit area of the positive electrode is larger than the irreversible capacity per unit area of the negative electrode may be prepared. As such, in the case where the irreversible capacity per unit area of the positive electrode is larger than the irreversible capacity per unit area of the negative electrode, the range of a driving voltage is limited to the range excluding the irreversible capacity of the positive electrode, so that the capacity loss of the positive electrode may not occur, and the low potential region of the negative electrode, in which rapid volume expansion of the Si-based negative electrode active material occurs, may not be used, thereby effectively preventing the lifetime reduction that might be caused by the negative electrode volume expansion.

Hereinafter, each component of the lithium secondary battery according to the present disclosure is described in more detail.

Positive Electrode

A positive electrode according to the present disclosure may include a positive electrode active material in a single particle form having a $D_{50}$ of 5.5 μm to 8 μm and comprising a lithium oxide, and may further include a positive electrode conductive material and a positive electrode binder as needed. In particular, the positive electrode may include a positive electrode current collector, and a positive electrode composite layer formed on at least one side of the positive electrode current collector, and the positive electrode composite layer includes the positive electrode active material in a single particle form having a $D_{50}$ of 5.5 μm to 8 μm, 6.0 μm to 8 μm, 6.5 μm to 8 μm, 7.0 μm to 8 μm, or 7.5 μm to 8 μm, the positive electrode conductive material, and the positive electrode binder.

The positive electrode active material in a single particle form may include 30 or less, preferably 1 to 25, and more preferably 1 to 15 nodules, 1 to 10 nodules, or 1 to 5 nodules. Since the positive electrode active material in a single particle form has a small number of nodules constituting the particle and thus has a small grain boundary in the particle so that the area in contact with an electrolyte solution is small, less side reactions with the electrolyte solution occurs, and therefore, the amount of gas generation is significantly less than a conventionally-used positive electrode active material in a secondary particle form in which 40 to hundreds primary particles are aggregated. Therefore, in case of applying the positive electrode active material in a single particle form, excellent lifetime characteristics may be achieved. In addition, since the positive electrode active material in a single particle form has high resistance due to low mobility of lithium ions in the particle, if it is applied, efficiency of the positive electrode may decrease, and accordingly, the irreversible capacity of the positive electrode may become larger than the irreversible capacity of the negative electrode.

In the present disclosure, as the positive electrode active material in a single particle form, a positive electrode active material having a $D_{50}$ of 5.5 μm to 10 μm or 5.5 μm to 8 μm, preferably 5.5 μm to 7.5 μm, and more preferably 6 μm to 7 μm, or 6.5 μm to 7 μm is used. When $D_{50}$ of the positive electrode active material in a single particle form falls within the above ranges, the positive electrode resistance may increase even more, so that the irreversible capacity of the positive electrode may become larger than the irreversible capacity of the negative electrode.

In the positive electrode active material in a single particle form, according to the present disclosure, the average particle diameter of the nodule may be 0.8 μm to 4.0 μm, preferably of 0.8 μm to 3 μm, and more preferably of 1.0 μm to 3.0 μm, 1.5 μm to 3.0 μm, 2.0 μm to 3.0 μm, or 2.5 μm to 3.0 μm. When the average particle diameter of the nodule falls within the above ranges, particle fracture in preparation of the electrode may be minimized, and increase in resistance may be more effectively suppressed. The average particle diameter of the nodule refers to a value obtained by measuring each of particle diameters of the nodules observed from a SEM image obtained by analysis on a positive electrode active material powder using a scanning electron microscope and then calculating the arithmetic mean value of the measured values.

The lithium oxide of the positive electrode active material in a single particle form may be a lithium nickel-based oxide containing Ni at 88 mol % or greater based on the total metal content other than lithium of the lithium nickel-based oxide. In some aspects the lithium nickel-based oxide may contain Ni at 89 mol % or greater, and preferably 90 mol % or greater, 91 mol % or greater, 92 mol % or greater, 93 mol % or greater, 94 mol % or greater, 95 mol % or greater, 96 mol % or greater, 97 mol % or greater, 98 mol % or greater, or 99 mol % or greater.

The lithium nickel-based oxide may be represented by, for example, [Chemical Formula 1] below.

$$Li_{1+x}[Ni_aCo_bM^1_cM^2_d]O_2 \quad \text{[Chemical Formula 1]}$$

In [Chemical Formula 1], $M^1$ is one or more selected from Mn and Al, and is preferably Mn or a combination of Mn and Al from a durability perspective. Al may also be used alone as $M^1$.

$M^2$ above includes one or more selected from the group consisting of Zr, Y, B, W, Mg, Ce, Hf, Ta, La, Ti, Sr, Ba, F, P, and S.

$1+x$ above refers to an atomic fraction of lithium in the lithium nickel-based oxide, wherein $-0.2 \leq x \leq 0.2$, $-0.1 \leq x \leq 0.1$, or $0 \leq x \leq 0.1$ may be satisfied.

a above refers to an atomic fraction of nickel among metal elements other than lithium in the lithium nickel-based oxide, wherein $0.88 \leq a < 1$, $0.89 \leq a < 1$, $0.9 \leq a < 1$, or $0.9 \leq a \leq 0.97$, $0.91 \leq a \leq 0.97$, $0.92 \leq a \leq 0.97$, $0.93 \leq a \leq 0.97$, $0.94 \leq a \leq 0.97$, $0.95 \leq a \leq 0.97$, or $0.96 \leq a \leq 0.97$ may be satisfied. When the atomic fraction of nickel falls within the above ranges, higher energy density may be achieved.

b above refers to an atomic fraction of cobalt among the metal elements other than lithium in the lithium nickel-based oxide, wherein $0 < b < 0.12$, $0.01 \leq b < 0.12$, or $0.01 \leq b \leq 0.10$ may be satisfied.

c above refers to an atomic fraction of $M^1$ element among the metal elements other than lithium in the lithium nickel-based oxide, wherein $0 < c < 0.12$, $0.01 \leq c < 0.12$, or $0.01 \leq c \leq 0.10$ may be satisfied.

d above refers to an atomic fraction of $M^2$ element among the metal elements other than lithium in the lithium nickel-based oxide, wherein $0 \leq d \leq 0.05$, $0 \leq d \leq 0.03$, or $0 \leq d \leq 0.02$ may be satisfied.

More preferably, the lithium nickel-based oxide may be represented by, for example, [Chemical Formula 1-1] below.

$$Li_{1+x}[Ni_aCo_bMn_{c1}Al_{c2}M^2_d]O_2 \quad \text{[Chemical Formula 1-1]}$$

In [Chemical Formula 1-1], $M^1$, $M^2$, x, a, b, and d are the same as defined in [Chemical Formula 1], and $0 < c1 \leq 0.115$, $0.01 \leq c1 \leq 0.10$, or $0.01 \leq c1 \leq 0.10$ may be satisfied, and $0 < c2 \leq 0.05$, $0.005 \leq c1 < 0.03$, or $0.01 \leq c1 \leq 0.03$ may be satisfied.

In the case where the lithium nickel-based oxide includes Mn and Al at the same time as in [Chemical Formula 1-1], effect of further improving stability in particle structure of the positive electrode active material may be achieved. However, since capacity characteristics may be reduced in case of Al content being too high, it is preferable that the contents of Mn and Al fall within the above ranges, respectively.

The lithium nickel-based oxide may be represented by, for example, [Chemical Formula 1-2] below.

$$Li_{1+x}[Ni_aCo_bMn_{c1}Al_{c2}Al_{c2}]O_2 \quad \text{Chemical Formula 1-2]}$$

wherein
$0 \leq x \leq 0.1$, $0.9 \leq a \leq 0.97$, $0.01 \leq b \leq 0.10$, $0.01 \leq c1 \leq 0.10$, $0.01 \leq c1 \leq 0.10$.

The positive electrode active material according to the present disclosure may further include a coating layer on a surface of the lithium nickel-based oxide. The coating layer may include one or more coating elements selected from the group consisting of Co, Al, W, Ti, Mg, Zr, Y, Ba, Ca, Sr, Ta, Nb, P, B, and Mo. Preferably, the coating layer may contain Co, and more preferably, may contain Co and Al.

The positive electrode active material may be included in the amount of 93 wt. % to 99 wt. % or 94 wt. % to 99 wt. %, preferably 95 wt. % to 98 wt. %, 96 wt. % to 98 wt. %, or 97 wt. % to 98 wt. %, and more preferably 95 wt. % to 97 wt. % or 96 wt. % to 97 wt. % on the basis of the total weight of the positive electrode composite layer, which is the total amount of the sum of the positive electrode active material, the positive electrode conductive material, and the positive electrode binder. When the amount of the positive electrode active material falls within the above ranges, high energy density may be achieved.

The positive electrode conductive material is used to provide conductivity to the electrode, and any material may be used in the battery, without particular limitation, as long as it does not cause chemical changes and conducts electrons. Specific examples may be graphite such as natural graphite or artificial graphite; a carbon-based material including carbon black, acetylene black, ketjen black, channel black, furnace black, lamp black, thermal black, a carbon fiber, etc.; a powder or fiber of metal including copper, nickel, aluminum, silver, etc.; a conductive tube including carbon nanotube, etc.; a conductive whisker including zinc oxide, potassium titanate, etc.; a conductive metal oxide including titanium oxide, etc.; or a conductive polymer including a polyphenylene derivative, etc., and any one alone or a mixture of two or more thereof may be used. Good results are obtained with carbon nanotube. The positive electrode conductive material may be included in the amount of 0.1 to 15 wt. %, 0.1 to 10 wt. %, or 0.1 to 5 wt. % on the basis of the total weight of the positive electrode composite layer.

The positive electrode binder serves to improve binding between the positive electrode active material particles and adhesion between the positive electrode active material and the current collector. Specific examples may include polyvinylidene fluoride (PVDF), polyvinylidene fluoride-hexafluoropropylene copolymer (PVDF-co-HFP), polyvinylalcohol, polyacrylonitrile, polymethymethaxrylate, carboxymethyl cellulose (CMC), starch, hydroxypropyl cellulose, regenerated cellulose, polyvinylpyrrolidone, polytetrafluoroethylene, polyethylene, polypropylene, an ethylene-propylene-diene polymer (EPDM), a sulfonated-EPDM, a styrene-butadiene rubber (SBR), a fluorine rubber, poly acrylic acid, and a polymer in which hydrogen thereof is substituted with Li, Na, or Ca, or various copolymers thereof, and any one alone or a mixture of two or more thereof may be used. Good results are obtained with polyvinylidene fluoride (PVDF). The binder may be included in the amount of 0.1 to 15 wt. %, 0.1 to 10 wt. %, 0.1 to 5 wt. % on the basis of the total weight of the positive electrode composite layer.

The positive electrode may be prepared according to a typical method of preparing a positive electrode. In particular, a positive electrode active material is prepared, and optionally as needed, a positive electrode binder, a positive electrode conductive material, and a dispersant are dissolved or dispersed in a solvent to prepare a positive electrode slurry composition, then the positive electrode slurry is applied onto a positive electrode current collector and then dried and roll-pressed, or casting of the positive electrode slurry composition is performed onto a separate support, and a film separated from the support is then laminated on the positive electrode current collector to thereby prepare the positive electrode according to the present disclosure. In another aspect, the positive electrode may be prepared according to a method of preparing a positive electrode that does not utilize a solvent, e.g., a dry method.

The positive electrode current collector may include a highly conductive metal, and is not particularly limited as long as it is non-reactive in a voltage range of the battery while the positive electrode composite layer is easily adhered thereto. As the positive electrode current collector, for example, stainless steel, aluminum, nickel, titanium, calcined carbon, aluminum or stainless steel that is surface-treated with carbon, nickel, titanium, silver, etc., or the like may be used. In addition, the positive electrode current collector may generally have a thickness of 3 to 500 μm, and microscopic irregularities may also be formed on a surface of the current collector to improve the adhesion of the positive electrode active material. For example, the positive electrode current collector may be used in various forms including a film, a sheet, a foil, a net, a porous body, a foam body, a non-woven fabric body, etc.

For the solvent of the positive electrode slurry, solvents generally used in preparation of a positive electrode slurry in the art, for example, dimethyl sulfoxide (DMSO), isopropyl alcohol, N-methylpyrrolidone (NMP), dimethyl formamide (DMF), acetone, water, or a mixture thereof, may be used. The amount of the solvent used is sufficient if it dissolves or disperses the positive electrode active material, the conductive material, the binder, and the dispersant therein in consideration of the thickness of the slurry to be applied and the manufacturing yield, and provides a viscosity that allows excellent thickness uniformity upon application for preparation of the positive electrode thereafter.

The positive electrode according to the present disclosure may have a porosity of 16% to 24%, preferably of 16% to 23%, and more preferably of 16% to 22%, 16% to 21%, 16% to 20%, 16% to 19%, 16% to 18%, 16% to 17%. When the positive electrode porosity falls within the above ranges, excellent energy density may be achieved. When the positive electrode porosity is too high, the energy density may decrease, and when the positive electrode porosity is too low, impregnation of an electrolyte may be reduced, and thus the mobility of lithium ions may be reduced.

In addition, the positive electrode has a total thickness of 90 μm to 120 μm or 90 μm to 115 μm, preferably of 90 μm to 110 μm, and more preferably of 95 μm to 105 μm or 95 μm to 100 μm. When the positive electrode thickness falls within the above ranges, excellent characteristics of capacity per unit volume are exhibited.

In addition, the positive electrode may have an efficiency less than 90%, preferably of 87% or greater and less than 90%, and more preferably of 87% to 89% or 88% to 89%.

When the positive electrode efficiency is 90% or greater, the irreversible capacity of the positive electrode may be smaller than the irreversible capacity of the negative electrode, causing capacity loss of the positive electrode in the range of a driving voltage, and therefore, it might be difficult to achieve the effect of improving lifetime by excluding use of a low potential region of the negative electrode.

The positive electrode according to the present disclosure may have a discharge capacity of 200 mAh/g to 400 mAh/g or 200 mAh/g to 350 mAh/g, preferably of 200 mAh/g to 300 mAh/g or 200 mAh/g to 250 mAh/g, and more preferably of 210 mAh/g to 300 mAh/g, 220 mAh/g to 300 mAh/g, 230 mAh/g to 300 mAh/g, 240 mAh/g to 300 mAh/g, 250 mAh/g to 300 mAh/g, 260 mAh/g to 300 mAh/g, 270 mAh/g to 300 mAh/g, 280 mAh/g to 300 mAh/g, or 290 mAh/g to 300 mAh/g. The discharge capacity refers to a charge capacity measured by performing charging and discharging on a coin half-cell, which is prepared with the positive electrode according to the present disclosure and a lithium metal electrode as a counter electrode, with 0.1 C at a voltage in a range of 3 V to 4.4 V. When the positive electrode capacity falls within the above ranges, structural collapse of the positive electrode may be minimized, and durability may be secured.

Negative Electrode

A negative electrode according to the present disclosure includes a first negative electrode active material containing a Si—C composite, and may further include a negative electrode conductive material and a negative electrode binder as needed. In particular, the negative electrode includes a negative electrode current collector, and a negative electrode composite layer formed on at least one side of the negative electrode current collector, and the negative electrode composite layer includes the first negative electrode active material containing the Si—C composite.

The Si—C composite, a material having a composite structure in which silicon particles are dispersed in a carbon matrix, has a smaller irreversible capacity than that of SiOx which has been mainly used as a conventional Si-based negative electrode active material, has excellent conductivity, and has less volume change in charging and discharging. Therefore, in case of using the Si—C composite, due to decrease in irreversible capacity of the negative electrode, it is possible to prepare a negative electrode having a lower irreversible capacity than that of the positive electrode, and to improve capacity characteristics and lifetime characteristics.

Preferably, the Si—C composite may have a grain size of 20 nm or less, preferably of 1 nm to 20 nm, and more preferably of 1 nm to 18 nm, 1 nm to 16 nm, 1 nm to 14 nm, 1 nm to 12 nm, 1 nm to 10 nm, 1 nm to 8 nm, 1 nm to 6 nm, 1 nm to 4 nm, or 1 nm to 2 nm. When the grain size of the Si—C composite falls within the above ranges, excellent effect of improving cell resistance characteristics and lifetime characteristics is exhibited.

In addition, the Si—C composite may have a $D_{50}$ of 1 μm to 15 μm, preferably of 2 μm to 10 μm, and more preferably of 3 μm to 10 μm, 4 μm to 10 μm, 5 μm to 10 μm, 6 μm to 10 μm, 7 μm to 10 μm, 8 μm to 10 μm, or 9 μm to 10 μm. In addition, the Si—C composite may have a $D_{10}$ of 5 μm or less, and preferably of 1 to 5 μm, 1 to 4 μm, 1 to 3 μm, or 1 to 2 μm, and may have a $D_{90}$ of 6 μm to 20 μm, and preferably of 6 μm to 15 μm, 6 μm to 14 μm, 6 μm to 13 μm, 6 μm to 12 μm, 6 μm to 11 μm, 6 μm to 10 μm, 6 μm to 9 μm, 6 μm to 8 μm, or 6 μm to 7 μm. When the particle size distribution of the Si—C composite falls within the above ranges, the density of the negative electrode may increase, so that higher energy density may be achieved.

The negative electrode may further include a graphite-based negative electrode active material as a second negative electrode active material. The graphite-based negative electrode active material may be, for example, artificial graphite, natural graphite, or a combination thereof, and preferably a mixture of artificial graphite and natural graphite.

When the second negative electrode active material is the mixture of artificial graphite and natural graphite, the weight ratio of the artificial graphite:natural graphite may be 99:1 to 60:40, preferably 90:10 to 60:40, and more preferably 90:10 to 70:30, 90:10 to 85:15, 90:10 to 80:20, or 90:10 to 75:25. When the mixed ratio of artificial graphite and natural graphite falls within the above ranges, the lifetime characteristics may be further improved and fast-charging performance are excellent.

The weight ratio of the first negative electrode active material:the second negative electrode active material may be 2:98 to 20:80, preferably 2:98 to 15:85, and more preferably 5:95 to 15:85 5:95 to 10:90, or 5:95 to 7:93. When the weight ratio of the first negative electrode active material and the second negative electrode active material falls within the above ranges, the capacity characteristics and lifetime characteristics are all excellent.

The negative electrode active material may be included in the amount of 80 to 99 wt. %, preferably of 85 to 99 wt. %, and more preferably of 90 to 99 wt. % or 95 to 99 wt. % on the basis of the total weight of the negative electrode composite layer.

The negative electrode conductive material is used to provide conductivity to the negative electrode, and any material may be used without particular limitation as long as it is used as a conductive material of the lithium secondary battery. Specific examples of the negative electrode conductive material may be a carbon-based material including carbon black, acetylene black, ketjen black, channel black, furnace black, lamp black, thermal black, a carbon fiber, carbon nanotube, etc.; powder or fiber of metal including copper, nickel, aluminum, silver, etc.; a conductive whisker including zinc oxide, potassium titanate, etc.; a conductive metal oxide including titanium oxide, etc.; or a conductive polymer including a polyphenylene derivative, etc., and any one alone or a mixture of two or more thereof may be used. Preferably, as the negative electrode conductive material, carbon black, acetylene black, ketjen black, channel black, furnace black, lamp black, thermal black, carbon fiber, carbon nanotube, or a combination thereof may be used, and in the aspect of improvement in conductivity, it is more preferable to use a dotted conductive material and a linear conductive material together. The dotted conductive material is a material in a particle shape whose contact form with the negative electrode active material is in the form of a dot, and the examples thereof may be carbon black, acetylene black, ketjen black, channel black, furnace black, lamp black, thermal black, etc., and the linear conductive material is a material whose contact form with the negative electrode active material is in the form of a line, and the examples thereof may be carbon fiber, carbon nanotube, etc.

The negative electrode conductive material may be included generally in the amount of 1 to 20 wt. %, preferably 0.1 to 10 wt. % or 0.1 to 5 wt. %, and more preferably 0.1 to 1 wt. % or 0.1 to 0.5 wt. % on the basis of the total weight of the negative electrode composite layer.

Next, the negative electrode binder serves to improve binding between the negative electrode active material particles and adhesion between the negative electrode active material and the negative electrode current collector, and any material may be used, without particular limitation, as long as it is used as the negative electrode binder of the lithium secondary battery. Specific examples of the negative electrode binder may include polyvinylidene fluoride (PVDF), vinylidene fluoride-hexafluoropropylene copolymer (PVDF-co-HFP), polyvinylalcohol, polyacrylonitrile, carboxy methyl cellulose (CMC), starch, hydroxypropyl cellulose, regenerated cellulose, polyvinylpyrrolidone, poly-tetrafluoroethylene, polyethylene, polypropylene, an ethyl-ene-propylene-diene monomer rubber (EPDM rubber), a sulfonated-EPDM, a styrene-butadiene rubber (SBR), fluo-rine rubber, or various copolymers thereof, and any one alone or a mixture of two or more thereof may be used.

The negative electrode binder may be included in the amount of 1 to 20 wt. % or 1 to 15 wt. %, preferably 1 to 10 wt. % or 1 to 5 wt. %, and more preferably 1 to 3 wt. % or 1 to 2 wt. % on the basis of the total weight of the negative electrode composite layer.

The negative electrode may be prepared according to a typical method of preparing a negative electrode. In particular, a negative electrode active material is prepared, and optionally as needed, a negative electrode binder, a negative electrode conductive material, and a dispersant are dissolved or dispersed in a solvent to prepare a negative electrode slurry composition, then the negative electrode slurry is applied onto a negative electrode current collector, and then dried and roll-pressed, or casting of the negative electrode slurry composition is performed on a separate support, and a film separated from the support is then laminated on the negative electrode current collector to thereby prepare the negative electrode according to the present disclosure. In another aspect, the negative electrode may be prepared according to a method of preparing a negative electrode that does not utilize a solvent, e.g., a dry method.

As the negative electrode current collector, negative electrode current collectors generally used in the art may be used, and for example, copper, stainless steel, aluminum, nickel, titanium, calcined carbon, copper or stainless steel that is surface-treated with carbon, nickel, titanium, silver, etc., an aluminum-cadmium alloy, etc. may be used. The negative electrode current collector may generally have a thickness of 3 μm to 500 μm, and like the positive electrode current collector, microscopic irregularities may be formed on a surface of the current collector to strengthen binding force of the negative electrode active material. For example, the negative electrode current collector may be used in various forms including a film, a sheet, a foil, a net, a porous body, a foam body, a non-woven fiber body, etc.

As the solvent of the negative electrode slurry, solvents generally used in preparation of the negative electrode slurry in the art, for example, dimethyl sulfoxide (DMSO), iso-propyl alcohol, N-methylpyrrolidone (NMP), dimethyl for-mamide (DMF), acetone, water, or a mixture thereof, may be used. The amount of the solvent used is sufficient if it dissolves or disperses the negative electrode active material, the conductive material, the binder, and the dispersant therein in consideration of the thickness of the slurry to be applied and the manufacturing yield, and provides a viscos-ity that allows excellent thickness uniformity upon applica-tion for preparation of the negative electrode thereafter.

The negative electrode according to the present disclosure may have a porosity of 20% to 30%, preferably of 22% to 29%, and more preferably of 23% to 28%, 24% to 28%, 25% to 28%, 26% to 28%, or 27% to 28%. When the negative electrode porosity falls within the above ranges, since the density of the negative electrode increases, desired capacity characteristics may be achieved even though the thickness of the negative electrode is formed smaller than that of a conventional one.

The negative electrode may have a total thickness of 80 μm to 130 μm, preferably of 90 μm to 120 μm, and more preferably of 95 μm to 120 μm, 95 μm to 115 μm, 95 μm to 110 μm, 95 μm to 105 μm, or 95 μm to 100 μm. When the thickness of the negative electrode falls within the above ranges, reaction uniformity of the Si—C composite may be increased, and fast-charging performance may be improved.

The negative electrode may have an efficiency of 90% or greater, preferably of 90% to 94%, and more preferably of 90% to 93%, 91% to 93%, or 92% to 93%. When the efficiency of the negative electrode falls within the above ranges, the irreversible capacity of the negative electrode may be smaller than the irreversible capacity of the positive electrode, and accordingly, use of a low potential region of the negative electrode, in which the negative electrode expansion occurs rapidly in the range of a driving voltage, may be reduced, thereby achieving the effect of improving the lifetime characteristics.

The negative electrode may have a discharge capacity of 400 mAh/g to 600 mnAh/g, preferably of 400 mAh/g to 550 mAh/g or 400 mAh/g to 500 mAh/g, and more preferably of 450 mAh/g to 550 mAh/g. The discharge capacity refers to a discharge capacity measured by performing charging and discharging on a coin half-cell, which is prepared with the negative electrode according to the present disclosure and a lithium metal electrode as a counter electrode, with 0.1 C at a voltage in a range of 0.005 V to 1 V, i.e., the measured discharge capacity of the negative electrode. When the discharge capacity of the negative electrode falls within the above ranges, the capacity per unit volume of a unit cell may be 270 mAh/cm$^3$ or greater or 280 mAh/cm$^3$ or greater, and preferably 290 mAh/cm$^3$ or greater.

Electrolyte

The electrolyte used in the present disclosure may include various electrolytes that may be used for a lithium secondary battery, for example, an organic liquid electrolyte, an inorganic liquid electrolyte, a solid polymer electrolyte, a gel-type polymer electrolyte, a solid inorganic electrolyte, a molten-type inorganic electrolyte, etc., and the type is not particularly limited thereto.

In particular, the electrolyte may include an organic solvent and a lithium salt.

Any organic solvent may be used as the organic solvent without particular limitation as long as it may function as a medium through which ions involved in an electrochemical reaction of the battery may move. In particular, as the organic solvent, an ester-based solvent including methyl acetate, ethyl acetate, γ-butyrolactone, ε-caprolactone, etc.; an ether-based solvent including dibutyl ether, tetrahydrofuran, etc.; a ketone-based solvent including cyclohexanone, etc.; an aromatic hydrocarbon-based solvent including benzene, fluorobenzene, etc.; a carbonate-based solvent including dimethylcarbonate (DMC), diethylcarbonate (DEC), methylethylcarbonate (MEC), ethylmethylcarbonate (EMC), ethylene carbonate (EC), propylene carbonate (PC), etc.; an alcohol-based solvent including ethylalcohol, isopropyl alcohol, etc.; nitriles including R—CN (where R is a linear, branched, or cyclic C2 to C20 hydrocarbon group, and may include a double-bond aromatic ring or an ether bond), etc.; amides including dimethylformamide, etc.; dioxolanes including 1,3-dioxolane, etc.; or sulfolanes may be used. Among these, a carbonate-based solvent is preferable, and a mixture of a cyclic carbonate (for example, ethylene carbonate, propylene carbonate, or the like) having high ionic conductivity and high dielectric constant capable of increasing charging and discharging performance of a battery, and a low-viscosity linear carbonate-based compound (for example, ethylmethyl carbonate, dimethyl carbonate, diethyl carbonate, or the like) is more preferable.

As the organic solvent, a gas-free organic solvent may be preferred. As understood by those skilled in the art, a gas-free solvent is a solvent that has been designed to eliminate sites in its structure where gas generation can occur. For example, to create a gas-free solvent, a solvent can be boiled for a long time under pressure to remove any dissolved gases.

Any compound capable of providing lithium ions that are used in a lithium secondary battery may be used as the lithium salt without particular limitation. In particular, for the lithium salt, LiPF$_6$, LiClO$_4$, LiAsF$_6$, LiBF$_4$, LiSbF$_6$, LiAlO$_4$, LiAlCl$_4$, LiCF$_3$SO$_3$, LiC$_4$F$_9$SO$_3$, LiN(C$_2$F$_5$SO$_3$) 2, LiN(C$_2$F$_5$SO$_2$)$_2$, LiN(CF$_3$SO$_2$)$_2$, LiCl, LiI, LiB(C$_2$O$_4$)$_2$, a combination thereof, or the like may be used. The lithium salt may be used in a concentration range of 0.1 to 5.0 M or 0.1 to 4.0 M, preferably of 0.1 to 3.0 M, 0.1 to 2.0 M, or 0.1 to 1.0 M. When the concentration of lithium salt falls within the above ranges, the electrolyte may have appropriate conductivity and viscosity, and therefore, excellent performance of the electrolyte may be exhibited, and lithium ions may move effectively.

In addition to the above-described components, an additive may further be included in the electrolyte for the purpose of improving lifetime characteristics of a battery, suppressing reduction of battery capacity, improving a discharge capacity of the battery, etc. For example, the electrolyte may include at least one additive selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

Examples of the cyclic carbonate-based compound may include vinylene carbonate (VC) or vinylethylene carbonate.

Examples of the halogen-substituted carbonate-based compound may include fluoroethylene carbonate (FEC).

Examples of the sultone-based compound may include at least one compound selected from the group consisting of 1,3-propane sultone (PS), 1,4-butane sultone, ethene sultone, 1,3-propene sultone (PRS), 1,4-butene sultone, and 1-methyl-1,3-propene sultone.

Examples of the sulfate-based compound may include Ethylene Sulfate (Esa), Trimethylene sulfate (TMS), or Methyl trimethylene sulfate (MTMS).

Examples of the phosphate-based compound may include one or more compounds selected from the group consisting of lithium difluoro(bisoxalato)phosphate, lithium difluorophosphate, tetramethyl trimethyl silyl phosphate, trimethyl silyl phosphite, tris(2,2,2-trifluoroethyl) phosphate, and tris (trifluoroethyl)phosphite.

Examples of the borate-based compound may include tetraphenylborate, lithium oxalyldifluoroborate (LiODFB), lithium bisoxalatoborate (LiB(C$_2$O$_4$) 2, LiBOB).

Examples of the nitrile-based compound may include at least one selected from the group consisting of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

Examples of the benzene-based compound may include fluorobenzene, examples of the amine-based compound may include triethanolamine, ethylene diamine, or the like, and examples of the silane-based compound may include tetravinylsilane.

The lithium salt-based compound is a compound different from a lithium salt included in the non-aqueous electrolyte, and may include lithium difluorophosphate (LiDFP), $LiPO_2F_2$, $LiBF_4$, or the like.

The additive may be included in the amount of 0.1 to 10 wt. %, and preferably 0.1 to 5 wt. %, 0.1 to 4 wt. %, 0.1 to 3 wt. %, 0.1 to 2 wt. %, or 0.1 to 1 wt. % on the basis of the total weight of the electrolyte.

Separator

The separator separates the negative electrode and the positive electrode, and provides a movement path of lithium ions, and any separator may be used, without particular limitation, as long as it is generally used in a lithium secondary battery as a separator. In particular, as the separator, a porous polymer film, for example, a porous polymer film prepared with a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof, may be used. In addition, a general porous non-woven fabric, for example, a non-woven fabric made of glass fiber with high meting point, polyethylene terephthalate fiber, etc. may also be used. Furthermore, a coated separator including a ceramic component or a polymer material may also be used in order to secure heat resistance or mechanical strength.

In some aspects, the separator may be a thin film separator having a thickness of 15 microns or less, 14 microns or less, 13 microns or less, 12 microns or less, 11 microns or less, 10 microns or less, 9 microns or less, 8 microns or less, 7 microns or less, 6 microns or less, or 5 microns or less.

In some aspects, the separator may include a ceramic coating on one or two sides thereof to provide enhanced safety.

In some aspects, a solid-state electrolyte layer may be used instead of or in addition to the separator. The solid-state electrolyte may comprise, consist of, or consist essentially of a solid-state electrolyte or a combination of a solid-state electrolyte and a liquid electrolyte.

The lithium secondary battery may include at least one unit cell including one negative electrode as defined above, one positive electrode as defined above, and two separators. The lithium secondary battery according to the present disclosure may include one unit cell, and may also include two or more unit cells. In a case where a plurality of unit cells is included, high energy density may be achieved.

The unit cell may have a total thickness of 220 μm to 240 μm, preferably of 225 μm to 240 μm, and more preferably of 230 μm to 240 μm or 235 μm to 240 μm. When the thickness of the unit cell falls within the above ranges, the unit cell may be provided to have a high capacity per volume of 270 mAh/cm³ or greater, 280 mAh/cm³ or greater and preferably of 290 mAh/cm³ or greater, and thus, a battery with high energy density may be prepared.

The lithium secondary battery according to the present disclosure, which is provided in the above-described configuration, exhibits excellent capacity characteristics, lifetime characteristics, and possibly fast-charging performance.

In particular, the lithium secondary battery according to the present disclosure, where the unit cell has a capacity per unit volume of 270 mAh/cm³ or greater, preferably of 270 mAh/cm³ to 350 mAh/cm³, and more preferably of 290 mAh/cm³ to 320 mAh/cm³, has high-capacity characteristics.

In addition, the lithium secondary battery according to the present disclosure has a capacity retention rate of 85% or greater after 500 cycles of charging and discharging at room temperature, exhibiting excellent lifetime characteristics.

Furthermore, the lithium secondary battery according to the present disclosure has a lithium plating point of SOC 45% or higher at 3 C charging, exhibiting excellent fast-charging performance.

The lithium secondary battery according to the present disclosure, previously described, may be used to prepare a battery pack. The battery pack may include an assembly to which the lithium secondary battery, according to the present disclosure, is electrically connected, and a pack housing which accommodates the assembly, and the pack housing may include a bus bar, for electrically connecting the lithium secondary batteries, a cooling unit, an external terminal, etc. The battery pack may be provided in a vehicle. The vehicle may be, for example, an electric vehicle, a hybrid vehicle, or a plug-in hybrid vehicle. The vehicle includes a four-wheeled vehicle or a two-wheeled vehicle. In particular, the lithium secondary battery according to the present disclosure has high energy density and excellent fast-charging performance, and may thus be useful as a battery for the electric vehicles.

Hereinafter, the present invention is described in more detail through particular examples. However, the following examples are only intended to aid understanding of the present invention, and the scope of the present invention is not limited thereto.

Example 1

Preparation of Positive Electrode

A positive electrode active material: a positive electrode conductive material: a PVDF binder were mixed in an N-methylpyrrolidone in a weight ratio of 97:1.2:1.4 to prepare a positive electrode slurry. At this time, $Li[Ni_{0.93}Co_{0.05}Mn_{0.01}Al_{0.01}]O_2$ in a single particle form with $D_{50}$ of 6 μm was used as the positive electrode active material, and carbon nanotube was used as the positive electrode conductive material.

The positive electrode slurry was applied onto both sides of an aluminum current collector sheet having a thickness of 12 μm, dried and then roll-pressed to prepare a positive electrode having a total positive electrode thickness of 102.0 μm, a positive electrode porosity of 18% and positive electrode loading amount of 3.5 mAh/cm².

Preparation of Negative Electrode

A negative electrode active material: a negative electrode conductive material: a styrene-butadiene rubber (SBR): carboxymethyl cellulose (CMC) were mixed in water in a weight ratio of 96.6:0.5:1.8:1.1 to prepare a negative electrode slurry. At this time, a Si—C composite (capacity 1800 mAh/g, efficiency 85%): artificial graphite: natural graphite were mixed in a weight ratio of 7:74.4:18.6 to be used as the negative electrode active material, and a mixture of Super C (carbon black) and a single-wall carbon nanotube was used as the negative electrode conductive material.

The negative electrode slurry was applied onto both sides of a copper current collector sheet having a thickness of 6 μm, dried and then roll-pressed to prepare a negative electrode having a total negative electrode thickness of 110.5 μm a negative electrode porosity of 25%, and negative electrode loading amount of 3.731 mAh/cm$^2$.

Preparation of Lithium Secondary Battery

The positive electrode and the negative electrode, prepared as previously described, and two separators were stacked in the order of positive electrode/separator/negative electrode/separator to prepare a unit cell, and the 29 unit cells were stacked to prepare an electrode assembly. Thereafter, the electrode assembly was inserted in a battery case, and then an electrolyte was introduced to prepare a lithium secondary battery.

Example 2

A lithium secondary battery was prepared in the same manner as that of Example 1 except that a Si—C composite: artificial graphite:natural graphite were mixed in a weight ratio of 10:72:18 to be used as the negative electrode active material, and the negative electrode was prepared to have a total negative electrode thickness of 101.8 μm.

Example 3

A lithium secondary battery was prepared in the same manner as that of Example 1 except that a Si—C composite having a capacity of 1800 mAh/g and an efficiency of 82.4% was used as the Si—C composite.

Example 4

A lithium secondary battery was prepared in the same manner as that of Example 1 except that the positive electrode was prepared to have a total positive electrode thickness of 105.4 μm and a positive electrode porosity of 21%.

Example 5

A lithium secondary battery was prepared in the same manner as that of Example 1 except that the positive electrode was prepared to have a total positive electrode thickness of 107.8 μm and a positive electrode porosity of 23%.

Comparative Example 1

A lithium secondary battery was prepared in the same manner as that of Example 1 except that SiO (capacity 1295 mAh/g, efficiency: 78.7%): artificial graphite: natural graphite were mixed in a weight ratio of 7:74.4:18.6 to be used as the negative electrode active material, and the negative electrode was prepared to have a total negative electrode thickness of 118.6 μm.

Comparative Example 2

A lithium secondary battery was prepared in the same manner as that of Example 1 except that Li[Ni$_{0.86}$Co$_{0.08}$Mn$_{0.06}$]O$_2$ in a single particle form with D$_{50}$ of 4 μm was used as the positive electrode active material, the positive electrode was prepared to have a total positive electrode thickness of 109.0 μm and a positive electrode porosity of 23%, SiO (capacity 1295 mAh/g, efficiency: 78.7%): artificial graphite: natural graphite were mixed in a weight ratio of 11:71.2:17.8 to be used as the negative electrode active material, and the negative electrode was prepared to have a total negative electrode thickness of 109.4 μm.

Comparative Example 3

A lithium secondary battery was prepared in the same manner as that of Example 1 except that Li[Ni$_{0.86}$Co$_{0.08}$Mn$_{0.06}$]O$_2$ in a single particle form with D$_{50}$ of 4 μm was used as the positive electrode active material, the positive electrode was prepared to have a total positive electrode thickness of 109.0 μm and a positive electrode porosity of 23%, SiO (capacity 1295 mAh/g, efficiency: 78.7%): artificial graphite: natural graphite were mixed in a weight ratio of 4:76.8:19.2 to be used as the negative electrode active material, and the negative electrode was prepared to have a total negative electrode thickness of 126.7 μm.

Comparative Example 4

A lithium secondary battery was prepared in the same manner as that of Example 1 except that, in preparation of the negative electrode, a Si—C composite: artificial graphite:natural graphite were mixed in a weight ratio of 10:72:18 to be used as the negative electrode active material, and the negative electrode was prepared to have a total negative electrode thickness of 103.7 μm, a negative electrode porosity of 25% and a negative electrode loading amount of 3.801 mAh/cm$^2$.

Comparative Example 5

A lithium secondary battery was prepared in the same manner as that of Example 1 except that, Li[Ni$_{0.93}$Co$_{0.05}$Mn$_{0.01}$Al$_{0.01}$]O$_2$ in a single particle form with D$_{50}$ of 4 μm was used as the positive electrode active material, the positive electrode was prepared to have a total positive electrode thickness of 100.7 μm and a positive electrode porosity of 18%, and the negative electrode was prepared to have a total negative electrode thickness of 110.2 μm.

The constitutions and N/P ratio of the lithium secondary batteries according to the examples and comparative examples were listed in Table 1 below. The N/P ratio refers to the ratio of the discharge capacity of the anode per unit area to that of the cathode per unit area.

TABLE 1

| | | Positive electrode | | | Negative electrode | | | |
| | | | | | Si | | | |
| | Ni mol % | D50 (μm) | Porosity (%) | Thickness (μm) | type/content (wt. %) | Porosity (%) | Thickness (μm) | N/P ratio |
| --- | --- | --- | --- | --- | --- | --- | --- | --- |
| Example 1 | 93 | 6 | 18 | 102 | Si—C/7 | 25 | 110.5 | 106.6 |
| Example 2 | 93 | 6 | 18 | 102 | Si—C/10 | 25 | 101.8 | 106.6 |

TABLE 1-continued

| | | | | | Negative electrode | | | |
| | | Positive electrode | | | Si | | | |
| | Ni mol % | D50 (μm) | Porosity (%) | Thickness (μm) | type/content (wt. %) | Porosity (%) | Thickness (μm) | N/P ratio |
|---|---|---|---|---|---|---|---|---|
| Example 3 | 93 | 6 | 18 | 102 | Si—C/7 | 25 | 110.5 | 106.6 |
| Example 4 | 93 | 6 | 21 | 105.4 | Si—C/7 | 25 | 110.5 | 106.6 |
| Example 5 | 93 | 6 | 23 | 107.8 | Si—C/7 | 25 | 110.5 | 106.6 |
| Comparative Example 1 | 93 | 6 | 18 | 105.4 | SiO/7 | 25 | 118.6 | 106.6 |
| Comparative Example 2 | 86 | 4 | 23 | 109 | SiO/11 | 25 | 109.4 | 106.6 |
| Comparative Example 3 | 86 | 4 | 23 | 109 | SiO/4 | 25 | 126.7 | 106.6 |
| Comparative Example 4 | 93 | 6 | 18 | 102 | Si—C/10 | 25 | 103.7 | 108.6 |
| Comparative Example 5 | 93 | 4 | 18 | 100.7 | Si—C/7 | 25 | 110.2 | 106.6 |

Experimental Example 1

Capacities and efficiency of the positive electrodes and the negative electrodes prepared according to the examples and the comparative examples were measured as follows.

Method of Measuring Positive Electrode Property

A positive electrode composite layer, formed on one side of a positive electrode current collector in each of positive electrodes prepared according to the examples and the comparative examples, was cleansed and removed to prepare a single-sided positive electrode. A separator was introduced between the single-sided positive electrode and a lithium counter electrode, and an electrolyte was injected to prepare a positive electrode coin half-cell. The positive electrode coin half-cell was charged with 0.1 C and CC-CV mode (0.05 C cut-off) until a voltage reaches 4.30 V, and then discharged with 0.1 C and CC mode until a voltage reaches 3 V to measure a charge capacity and a discharge capacity, and from the measured charge capacity and discharge capacity, the positive electrode efficiency ((measured positive electrode discharge capacity/measured positive electrode charge capacity)×100) and the irreversible capacity per unit area of the positive electrode ((measured positive electrode charge capacity−measured positive electrode discharge capacity)/positive electrode area) were calculated.

Method of Measuring Negative Electrode Property

A negative electrode composite layer, formed on one side of a negative electrode current collector in each of negative electrodes prepared according to the examples and the comparative examples, was cleansed and removed to prepare a single-sided negative electrode. A separator was introduced between the single-sided negative electrode and a lithium counter electrode, and an electrolyte was injected to prepare a negative electrode coin half-cell. The negative electrode coin half-cell was charged with 0.1 C and CC-CV mode (0.005 C cut-off) until a voltage reaches 5 mV, and then discharged with 0.1 C and CC mode until a voltage reaches 1 V to measure a charge capacity and a discharge capacity, and from the measured charge capacity and discharge capacity, the negative electrode efficiency ((measured negative electrode discharge capacity/measured negative electrode charge capacity)×100) and the irreversible capacity per unit area of the negative electrode ((measured negative electrode charge capacity−measured negative electrode discharge capacity)/negative electrode area) were calculated.

In addition, according to the equation below, the ratio of irreversible capacity (RIC) per unit area of the positive electrode to the irreversible capacity per unit area of the negative electrode was calculated.

The measurement results were listed in Table 2 below.

TABLE 2

| | Positive electrode discharge capacity (mAh/g) | Positive electrode efficiency (%) | Irreversible capacity per unit area of positive electrode | Negative electrode discharge capacity (mAh/g) | Negative electrode efficiency (%) | Irreversible capacity per unit area of negative electrode | RIC |
|---|---|---|---|---|---|---|---|
| Example 1 | 216 | 89 | 0.433 | 454 | 90.7 | 0.380 | 1.137 |
| Example 2 | 216 | 89 | 0.433 | 498 | 90 | 0.412 | 1.049 |
| Example 3 | 216 | 89 | 0.433 | 454 | 90.1 | 0.417 | 1.038 |
| Example 4 | 216 | 88.5 | 0.455 | 454 | 90.7 | 0.380 | 1.196 |
| Example 5 | 216 | 89 | 0.433 | 454 | 90.7 | 0.380 | 1.137 |
| Comparative Example 1 | 216 | 89 | 0.433 | 427 | 88.1 | 0.435 | 0.994 |
| Comparative Example 2 | 208 | 89.7 | 0.402 | 457 | 86.5 | 0.506 | 0.794 |
| Comparative Example 3 | 208 | 89.7 | 0.402 | 384 | 90.6 | 0.376 | 1.069 |
| Comparative Example 4 | 216 | 89 | 0.433 | 497 | 89.5 | 0.435 | 0.994 |
| Comparative Example 5 | 219 | 91 | 0.346 | 454 | 90.7 | 0.380 | 0.910 |

Experimental Example 2

A composite layer, formed on one side of a current collector of each of the positive electrodes and negative electrodes prepared according to the examples and the comparative examples, was cleansed and removed to prepare a single-sided positive electrode and a single-sided negative electrode.

Thereafter, the single-sided positive electrode, the single-sided negative electrode, and separators were stacked in the order of single-sided positive electrode/separator/single-sided negative electrode/separator to prepare an electrode assembly, the electrode assembly was inserted in a battery case, and an electrolyte was injected to prepare a mono-cell.

Charging and discharging was performed on each of the mono-cells prepared as previously described with 0.1 C at a voltage in a range of 2.5 V to 4.25 V to measure a cell capacity, and the value was substituted into the equation below to measure a unit-cell capacity per unit volume.

$$\text{Unit-cell capacity per unit volume (mAh/cm3)} =$$
$$(\text{mono-cell capacity measured} \times 2)/(\{\text{positive electrode area} \times$$
$$(2 \times \text{thickness of positive electrode composite layer of single-sided}$$
$$\text{positive electrode} + \text{thickness of positive electrode current collector}$$
$$+ 2 \times \text{thickness of negative electrode composite layer of}$$
$$\text{single-sided negative electrode} + \text{thickness of negative}$$
$$\text{electrode current collector} + 2 \times \text{thickness of separator})\}$$

The measurement results were listed in Table 3 below.

Experimental Example 3

Charging and discharging was performed on the mono-cell, prepared according to Experimental Example 2 above, with 3 C at a voltage in a range of 2.5 V to 4.25 V to measure SOC at the point of lithium plating. The measurement results were listed in Table 3 below.

Experimental Example 4

500 cycles of charging and discharging were performed on each of the lithium secondary batteries, prepared according to the examples and the comparative examples, where 1 cycle refers to performing charging and discharging with 0.33 C at a voltage in a range of 2.5 V to 4.25 V at room temperature, and the capacity retention rate was then measured. The measurement results were listed in Table 3 below.

TABLE 3

| | Unit-cell capacity per unit volume (mAh/cm³) | Lithium plating SOC | Capacity retention rate at 500 cycles |
|---|---|---|---|
| Example 1 | 296.0 | 50 | 90.3 |
| Example 2 | 307.3 | 53 | 87.5 |
| Example 3 | 296.0 | 49 | 89.1 |
| Example 4 | 291.8 | 48 | 90.2 |
| Example 5 | 288.9 | 46 | 88.7 |
| Comparative Example 1 | 282.0 | 42 | 80.2 |
| Comparative Example 2 | 280.2 | 45 | 73.2 |

TABLE 3-continued

| | Unit-cell capacity per unit volume (mAh/cm³) | Lithium plating SOC | Capacity retention rate at 500 cycles |
|---|---|---|---|
| Comparative Example 3 | 269.5 | 39 | 88.6 |
| Comparative Example 4 | 304.5 | 51 | 81.6 |
| Comparative Example 5 | 296.1 | 46 | 77.5 |

As listed in Table 3 above, the lithium secondary batteries according to Examples 1 to 5, which include the single-particle positive electrode active material having a $D_{50}$ of 5.5 μm to 8 μm and the first negative electrode active material containing a Si—C composite and in which the irreversible capacity per unit area of the positive electrode is larger than the irreversible capacity per unit area of the negative electrode, have excellent capacity characteristics with a unit-cell capacity per unit volume of 260 mAhg/cm³ or greater, and also have excellent lifetime characteristics with a capacity retention rate of 85% or greater after 500 cycles. In addition, during the charging and discharging at high rate (3C), lithium plating occurred after SOC 45%, which means excellent fast-charging performance.

On the other hand, in case of the lithium secondary battery according to Comparative Example 1 in which silicon oxide, instead of the Si—C composite, was applied as a negative electrode active material, the irreversible capacity per unit area of the negative electrode was larger than the irreversible capacity per unit area of the positive electrode, and the capacity characteristics, lifetime characteristics, and fast-charging performance were inferior to those in the cases of Examples 1 to 5. Lithium plating occurred below SOC 45%.

Meanwhile, in case of the lithium secondary batteries according to Comparative Examples 2 and 3 each of which includes a single-particle positive electrode active material having a small particle diameter that is a $D_{50}$ of 5 μm or less, and includes a silicon oxide negative electrode active material, the capacity characteristics, lifetime characteristics, and fast-charging performance were inferior to those in the cases of Examples 1 to 5. Comparative Example 3 exhibits undesirable lithium plating at a significantly lower SOC than Examples 1-5.

In addition, in case of the lithium secondary battery according to Comparative Example 4 in which the irreversible capacity of the negative electrode is larger than the irreversible capacity of the positive electrode, it can be seen that the lifetime characteristics deteriorated, compared to those of Examples 1 to 5, even though the single-particle positive electrode active material having a $D_{50}$ of 5.5 μm to 8 μm and the first negative electrode active material containing the Si—C composite were included. This demonstrates that each of the following are important to achieving improved performance: (1) the single-particle positive electrode active material having a $D_{50}$ of 5.5 μm to 8 μm; (2) the first negative electrode active material containing the Si—C composite; and (3) an irreversible capacity per unit area of the negative electrode is smaller than an irreversible capacity per unit area of the positive electrode.

In addition, in the case of the lithium secondary battery of Comparative Example 5, it can be seen that using a single-particle positive electrode active material having a D50 outside the range of from 5.5 μm to 8 μm (e.g., 4 μm) results in deteriorated lifetime characteristics compared to Examples 1 to 5, which include a single-particle positive electrode active material having a $D_{50}$ within the range of from 5.5 μm to 8 μm.

The invention claimed is:

1. A lithium secondary battery comprising:

a positive electrode including a positive electrode active material that is in a single particle form, comprises a lithium nickel-based oxide, and has a $D_{50}$ of 5.5 μm to 8 μm;

a negative electrode including a first negative electrode active material that contains a Si—C composite; and an electrolyte, wherein an irreversible capacity per unit area of the negative electrode is smaller than an irreversible capacity per unit area of the positive electrode.

2. The lithium secondary battery of claim 1, wherein a ratio of the irreversible capacity per unit area of the positive electrode to the irreversible capacity per unit area of the negative electrode is greater than 1.01.

3. The lithium secondary battery of claim 1, wherein the lithium nickel-based oxide includes Ni at 88 mol % or greater of a total metal content other than lithium.

4. The lithium secondary battery of claim 3, wherein the lithium nickel-based oxide is represented by the following chemical formula 1:

$$Li_{1+x}[Ni_aCo_bM^1_cM^2_d]O_2 \quad (1), \text{wherein}$$

$M^1$ is one or more selected from Mn or Al, $M^2$ includes one or more selected from the group consisting of Zr, Y, B, W, Mg, Ce, Hf, Ta, La, Ti, Sr, Ba, F, P, and S, and $-0.2 \leq x \leq 0.2$, $0.88 \leq a < 1$, $0 < b < 0.12$, $0 < c < 0.12$, and $0 \leq d \leq 0.05$.

5. The lithium secondary battery of claim 1, wherein the positive electrode has a porosity of from 16% to 24%.

6. The lithium secondary battery of claim 1, wherein the positive electrode has a total thickness of from 90 μm to 120 μm.

7. The lithium secondary battery of claim 1, wherein the positive electrode has an efficiency of less than 90%.

8. The lithium secondary battery of claim 1, wherein the positive electrode has a discharge capacity of from 200 mAh/g to 400 mAh/g.

9. The lithium secondary battery of claim 1, wherein the negative electrode further comprises a graphite-based negative electrode active material as a second negative electrode active material, and a weight ratio of the first negative electrode active material to the second negative electrode active material is from 2:98 to 10:90.

10. The lithium secondary battery of claim 1, wherein the negative electrode has a porosity of from 20% to 30%.

11. The lithium secondary battery of claim 1, wherein the negative electrode has a total thickness of from 80 μm to 130 μm.

12. The lithium secondary battery of claim 1, wherein the negative electrode has an efficiency of 90% or higher.

13. The lithium secondary battery of claim 1, wherein the negative electrode has a discharge capacity of from 400 mAh/g to 600 mAh/g.

14. The lithium secondary battery of claim 1, wherein the lithium secondary battery comprises a unit cell including one negative electrode, one positive electrode, and two separators, and the unit cell has a thickness of from 220 μm to 240 μm.

15. The lithium secondary battery of claim 14, wherein the unit cell has a capacity per unit volume of 270 mAh/cm$^3$ or greater.

16. The lithium secondary battery of claim 1, wherein a ratio of the irreversible capacity per unit area of the positive electrode to the irreversible capacity per unit area of the negative electrode is 1.01 to 1.25.

17. The lithium secondary battery of claim 1, wherein a ratio of the irreversible capacity per unit area of the positive electrode to the irreversible capacity per unit area of the negative electrode is 1.04 to 1.20.

18. The lithium secondary battery of claim 1, wherein a ratio of the irreversible capacity per unit area of the positive electrode to the irreversible capacity per unit area of the negative electrode is 1.10 to 1.20.

19. The lithium secondary battery of claim 9, wherein a weight ratio of the first negative electrode active material to the second negative electrode active material is from 2:98 to 7:93.

20. The lithium secondary battery of claim 1, wherein the positive electrode has an efficiency of less than 90%, and the negative electrode has an efficiency of 90% or greater.

*    *    *    *    *